(12) United States Patent
Le Corre (10) Patent No.: US 10,875,550 B2
(45) Date of Patent: Dec. 29, 2020

(54) TABLE TOP FOR A VEHICLE INTERIOR

(71) Applicant: ALSTOM TRANSPORT TECHNOLOGIES, Saint-Ouen (FR)

(72) Inventor: Dominique Le Corre, Val de Moder (FR)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 0 days.

(21) Appl. No.: 16/653,859

(22) Filed: Oct. 15, 2019

(65) Prior Publication Data

US 2020/0114939 A1 Apr. 16, 2020

(30) Foreign Application Priority Data

Oct. 15, 2018 (FR) ...................................... 18 59518

(51) Int. Cl.
*A47B 31/06* (2006.01)
*B61D 37/00* (2006.01)
*B64D 11/06* (2006.01)
*B60N 3/00* (2006.01)

(52) U.S. Cl.
CPC .............. *B61D 37/00* (2013.01); *A47B 31/06* (2013.01); *B60N 3/004* (2013.01); *B64D 11/0619* (2014.12)

(58) Field of Classification Search
CPC ..... A47B 31/06; B64D 11/0619; B60N 3/004
USPC ..................................................... 108/42, 44
See application file for complete search history.

(56) References Cited

U.S. PATENT DOCUMENTS

| 2,749,143 | A | * | 6/1956 | Chika | ...................... B60R 21/02 280/751 |
| 3,985,374 | A | * | 10/1976 | Powaska | ................ B60N 3/004 280/730.1 |
| 4,019,443 | A | * | 4/1977 | Jones | .................... A47B 13/081 108/137 |

(Continued)

FOREIGN PATENT DOCUMENTS

| DE | 102005003705 A1 * | 8/2006 | ............. B60R 21/04 |
| DE | 10 2011 11875 A1 | 5/2013 | |

(Continued)

OTHER PUBLICATIONS

Search Report for French Application No. FR 1859518, dated Jun. 7, 2019.

*Primary Examiner* — Kyle R Grabowski
(74) *Attorney, Agent, or Firm* — Knobbe, Martens, Olson & Bear, LLP (57) ABSTRACT

A table top is for a vehicle compartment accommodating passengers, in particular a rail vehicle. The table top includes a stationary part connected to the vehicle and a moving tray located across from a passenger chair or seat. The tray is movable along an axis of rotation parallel to a plane of the table top. The table top includes a chassis on which the tray is mounted. The chassis is translatable relative to the stationary part along an axis parallel to the plane of the tray and perpendicular to the axis of rotation. In a deployed configuration, the tray is deployed jointly with the stationary part, with the chassis maximally separated from the stationary part. In a folded configuration, the tray is pivoted along its axis of rotation in an inclined position relative to the stationary part, with the chassis minimally separated from the stationary part.

11 Claims, 9 Drawing Sheets

(56) References Cited

U.S. PATENT DOCUMENTS

| | | | | |
|---|---|---|---|---|
| 5,359,349 A * | 10/1994 | Jambor | ................... | B60N 3/004 |
| | | | | 248/918 |
| 9,295,325 B2 * | 3/2016 | Luebke | ................ | A47B 13/081 |
| 2014/0338572 A1 | 11/2014 | Schiefer | | |
| 2017/0290415 A1 * | 10/2017 | Hsu | ....................... | A47B 13/081 |
| 2017/0355465 A1 | 12/2017 | Trimble | | |

FOREIGN PATENT DOCUMENTS

| | | | | |
|---|---|---|---|---|
| GB | 449971 A * | 7/1936 | ........... | A47B 13/081 |
| GB | 2 433 434 A | 6/2007 | | |
| WO | WO 2014/154666 A1 | 10/2014 | | |
| WO | WO 2016/146325 A1 | 9/2016 | | |

\* cited by examiner

TABLE TOP FOR A VEHICLE INTERIOR

CROSS-REFERENCE TO RELATED APPLICATION

This application claims priority to French Patent Application No. 18 59518 filed on Oct. 15, 2018, the disclosure of which including the specification, the drawings, and the claims is hereby incorporated by reference in its entirety.

FIELD OF THE INVENTION

The present invention relates to a table top for a passenger compartment accommodating passengers, in particular a rail vehicle.

Tables for vehicles accommodating passengers, in particular rail vehicles, offer a horizontal surface for working, eating or storing personal objects.

BACKGROUND OF THE INVENTION

Certain tabletops are designed to absorb the energy of passengers projected onto the table during a collision, limiting the risk of severe abdominal injuries. However, this protection is cursory, since the rigid table top remains an aggressive object (typically 20 mm to 40 mm thick).

Table tops incorporating foldable parts allow better access for people with reduced mobility. These foldable parts, however, do not make it possible to reduce the risks of injury.

SUMMARY OF THE INVENTION

The invention aims to resolve these drawbacks by proposing a table top for a vehicle compartment accommodating passengers, making it possible to limit the risks of injury for passengers, while maintaining usage and access comfort.

To that end, the invention relates to a table top for a vehicle compartment accommodating passengers, in particular a rail vehicle, this table top including a stationary part connected to the vehicle and at least one moving tray intended to be located across from a passenger chair or seat, this tray being movable along an axis of rotation parallel to a plane of the table top.

This tray is characterized in that it includes a chassis on which the tray is mounted with the possibility of rotating along the axis parallel to the plane of the tray, this chassis being translatable relative to the stationary part of the tray along an axis parallel to the plane of the tray and perpendicular to the axis of rotation of the tray, and in that:

- in a deployed configuration, the tray is deployed jointly with the stationary part of the table top, the chassis being in a position maximally separated from the stationary part of the table top;
- in a folded configuration, the tray is pivoted along its axis of rotation in an inclined position relative to the stationary part of the table top, the chassis being in a position minimally separated from the stationary part of the table top.

Owing to the invention, the energy of a passenger projected on the table top can be absorbed in large part and while increasing the outer surface area of the tray to reduce the risks of abdominal injuries.

According to advantageous but optional aspects of the invention, such a table top may incorporate one or more of the following features, considered in any technically allowable combination:

The chassis is able to go from the maximally separated position to the minimally separated position under the action of thrust from a body part of a passenger.

The tray includes an inclined part whereof one end, forming a part of the table top located closest to a passenger seated on an adjacent chair or seat, is located below the axis of rotation of the tray.

An edge of the tray located across from the stationary part of the table top includes a beveled lower part, and the stationary part of the table top comprises an edge suitable for cooperating with the beveled lower part so as to initiate the rotation of the tray around its axis during the translation of the chassis.

In the inclined position, the tray is oriented along an angle of between 70° and 90° relative to the stationary part of the table top.

The tray is mounted on the chassis using friction hinges able to keep the tray in an inclined position.

The chassis is connected to the stationary part of the table top by arms articulated on the stationary part of the table top and on the chassis.

The table top comprises a shock absorber arranged between the chassis and the stationary part of the table top.

The shock absorber is a cylinder, one part of which is fastened to the chassis and another part of which is fastened to the stationary part of the table top.

The shock absorber is a shaft fastened to the chassis and sliding with friction in the stationary part of the table top.

BRIEF DESCRIPTION OF THE DRAWINGS

The invention will be better understood, and other advantages thereof will appear more clearly, in light of the following description of a table top according to its principle, provided as a non-limiting example in reference to the appended drawings, in which.

DETAILED DESCRIPTION OF THE PREFERRED EMBODIMENTS

Figure 1:
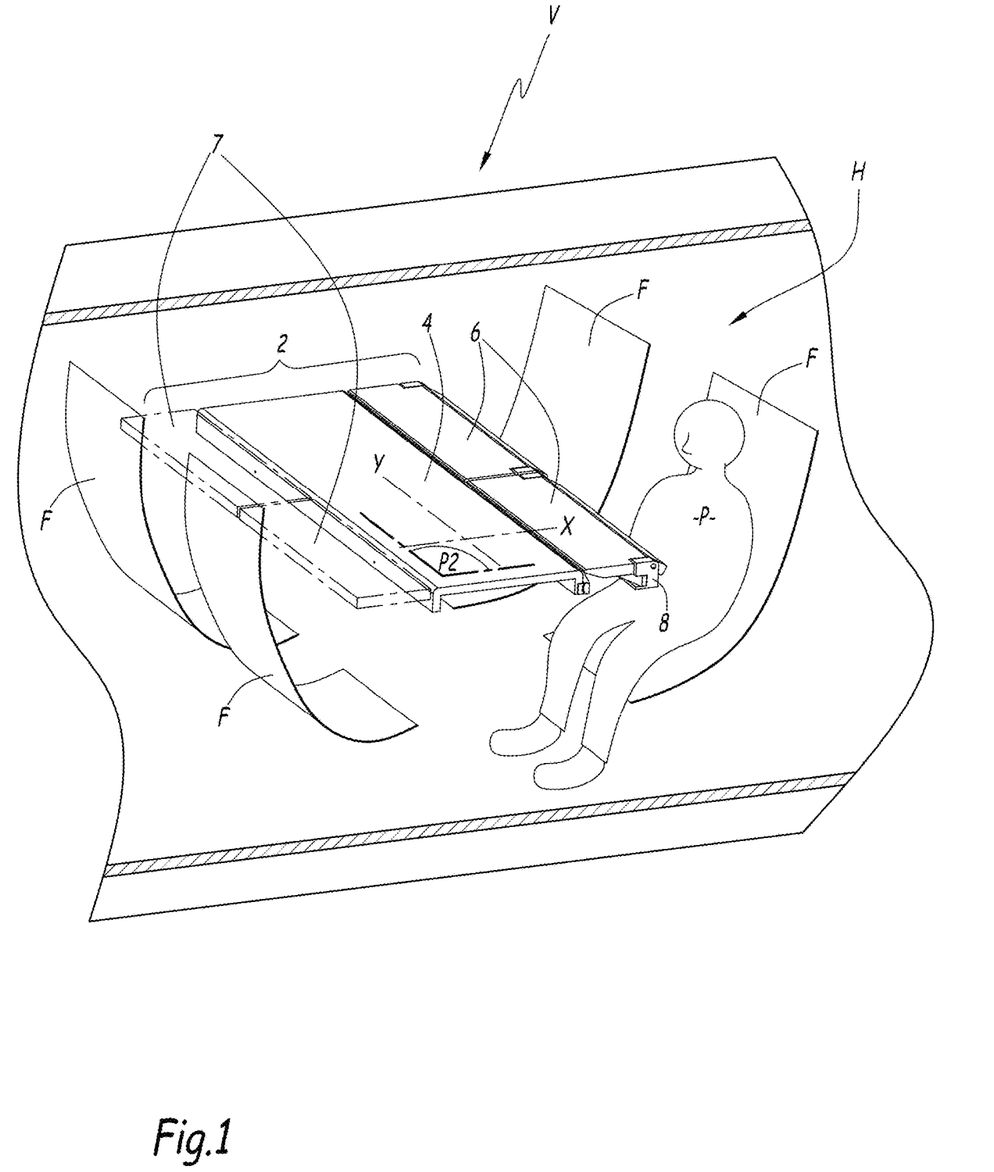
FIG. 1 is a perspective view of a table top according to the invention, chairs as well as a passenger seated on a chair.

FIG. 1 shows a table top 2 of a compartment H of a vehicle V accommodating passengers. This vehicle V can in particular be a rail vehicle, such as a car forming part of a train.

The compartment H also includes several chairs F or seats arranged around the table top 2, one of these chairs F being occupied by a seated passenger.

A longitudinal direction X of the vehicle V is defined, which corresponds to the direction of movement of this vehicle V. A transverse direction Y is also defined, orthogonal to the direction X. The directions X and Y form a plane P2 in which the table top 2 is comprised.

The table top 2 includes a stationary part 4 and at least one moving tray 6 suitable for being located across from one of the chairs F. The tray 6 is movable relative to the stationary part 4 in rotation along an axis of rotation Y6, parallel to the transverse direction Y.

The stationary part 4 does not include any degree of rotational or translational freedom along the directions X or Y relative to the vehicle V. The stationary part 4 can be supported by a direct attachment in one wall, not shown, of the vehicle V, or by a foot, not shown, fastened to the ground, or by a combination of these two solutions.

The table top 2 also includes a chassis 8 on which the tray 6 is mounted with a possibility of rotation along the axis of rotation Y6. This chassis 8 is translatable relative to the stationary part 4 along an axis X8 parallel to the plane P2 and perpendicular to the axis of rotation Y6 of the tray 6. The axis X8 is therefore parallel to the longitudinal direction X.

Figure 2:
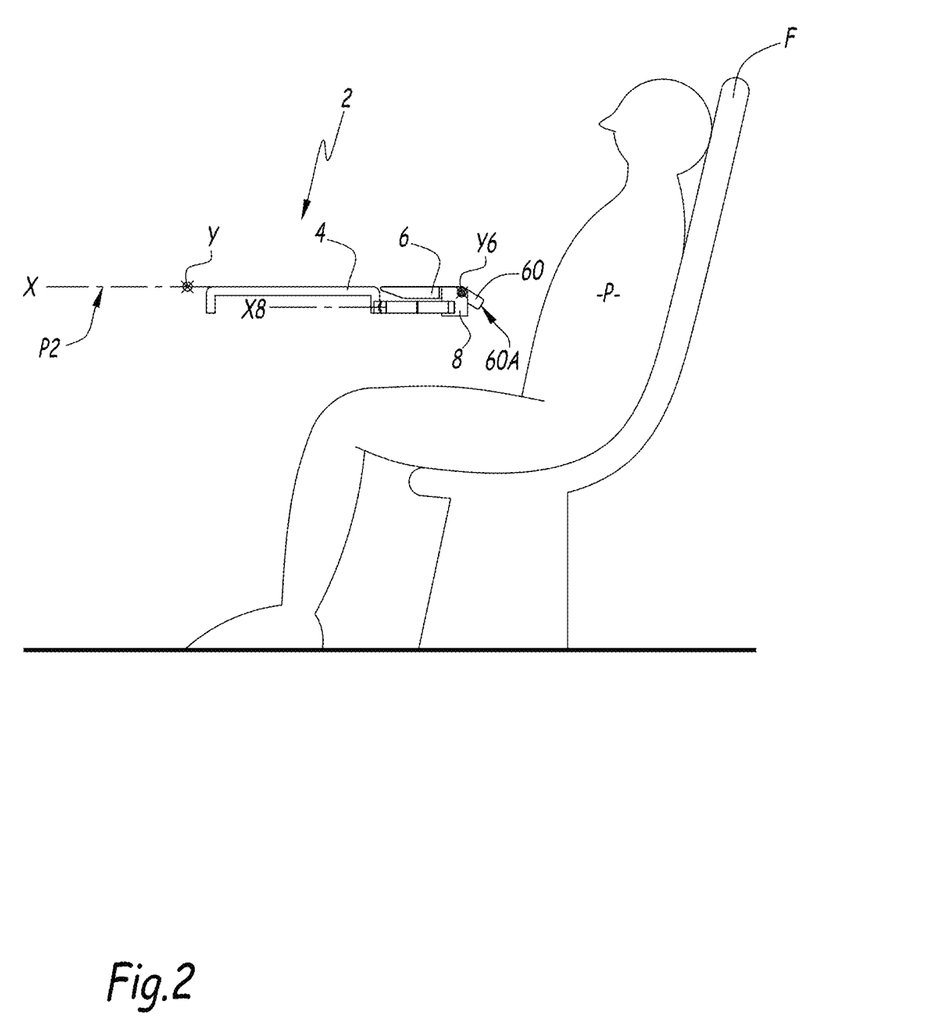
FIG. 2 is a side view of the table top and of the passenger seated on a chair.
Figure 5:
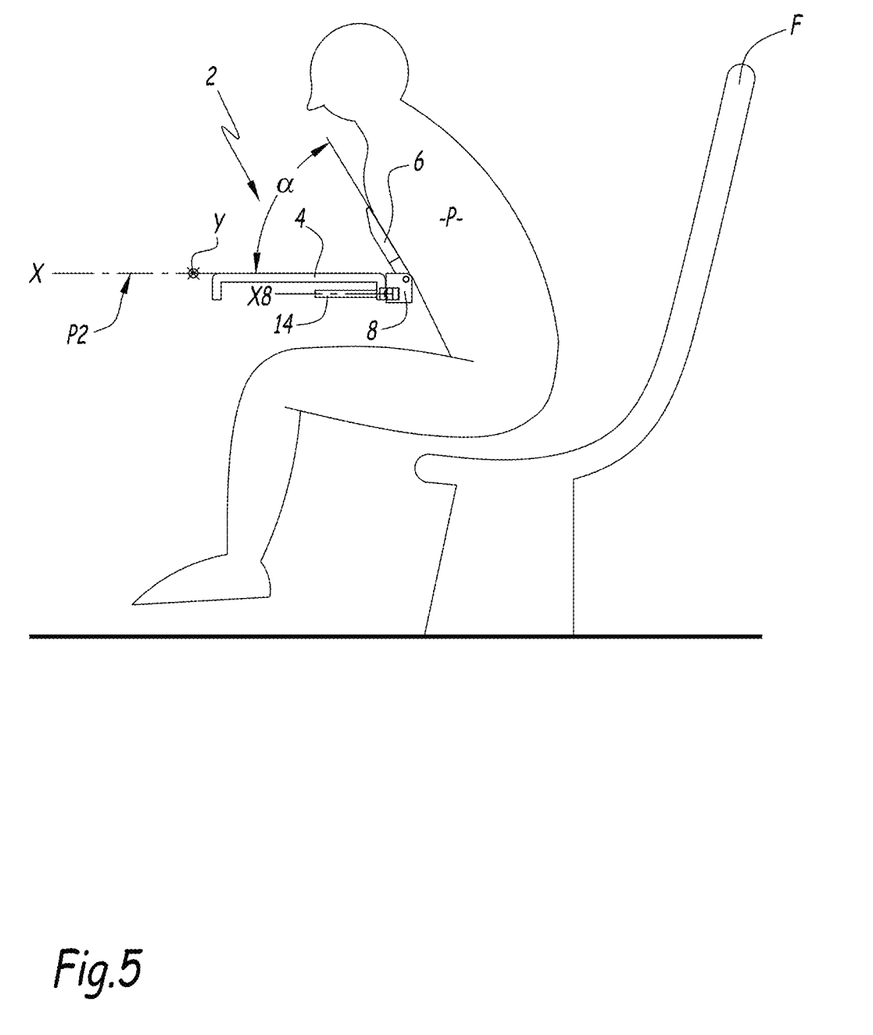
Figure 6:
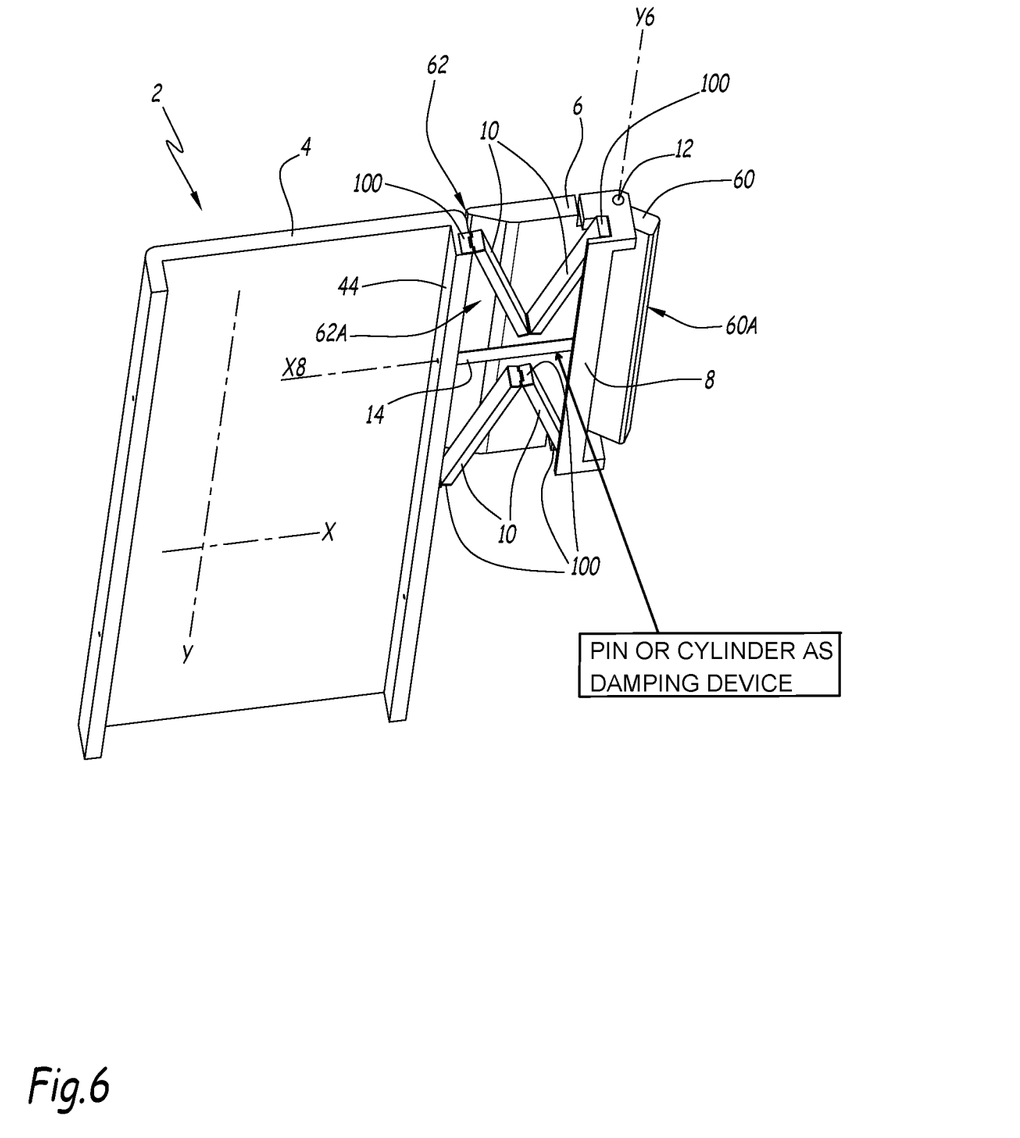
FIG. 6 is a perspective view of the table top of FIG. 1, along another angle.
Figure 7:
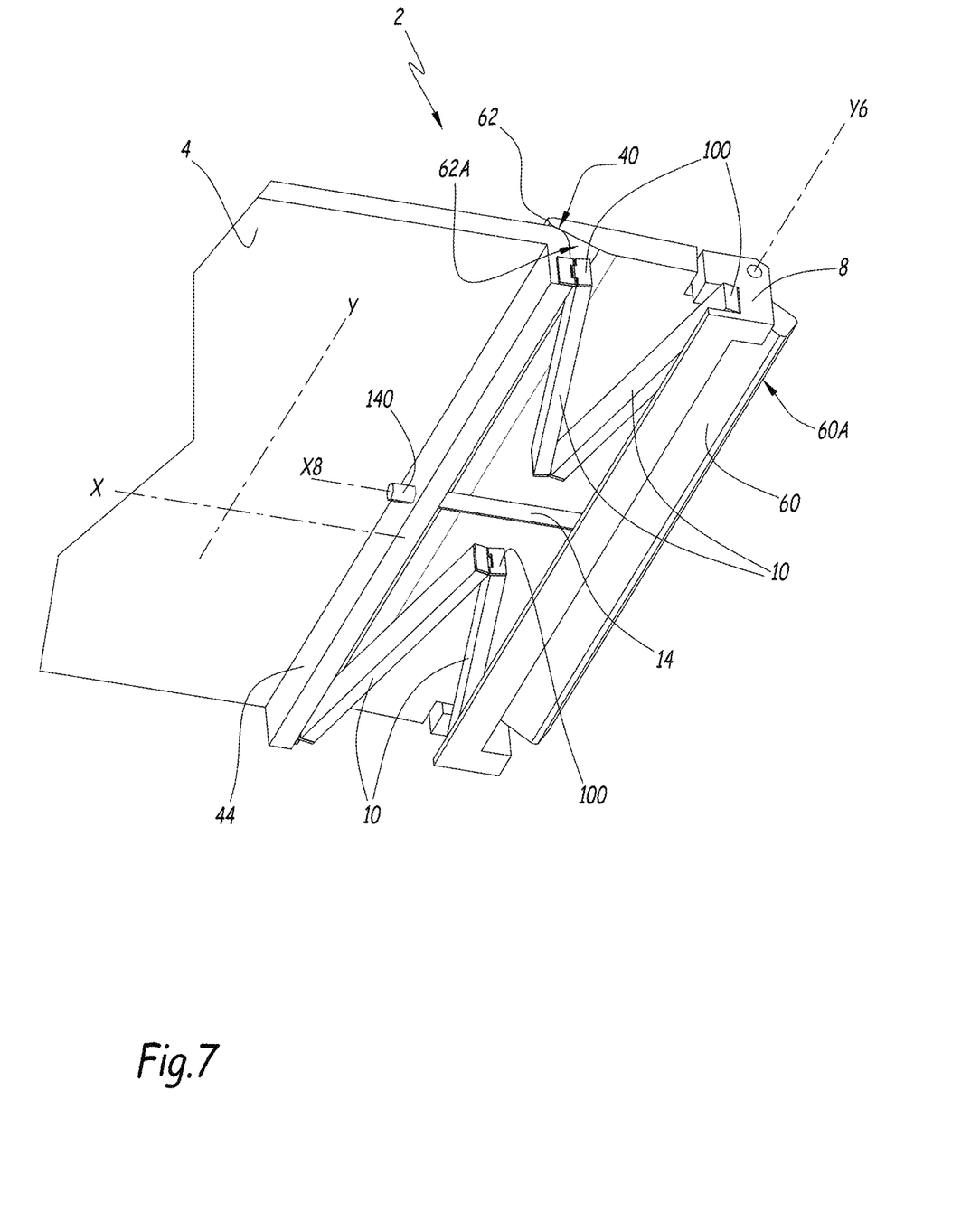
FIGS. 7 to 9 are perspective views similar to FIG. 6, showing three positions of a tray of the table top in a rotational movement.
Figure 8:
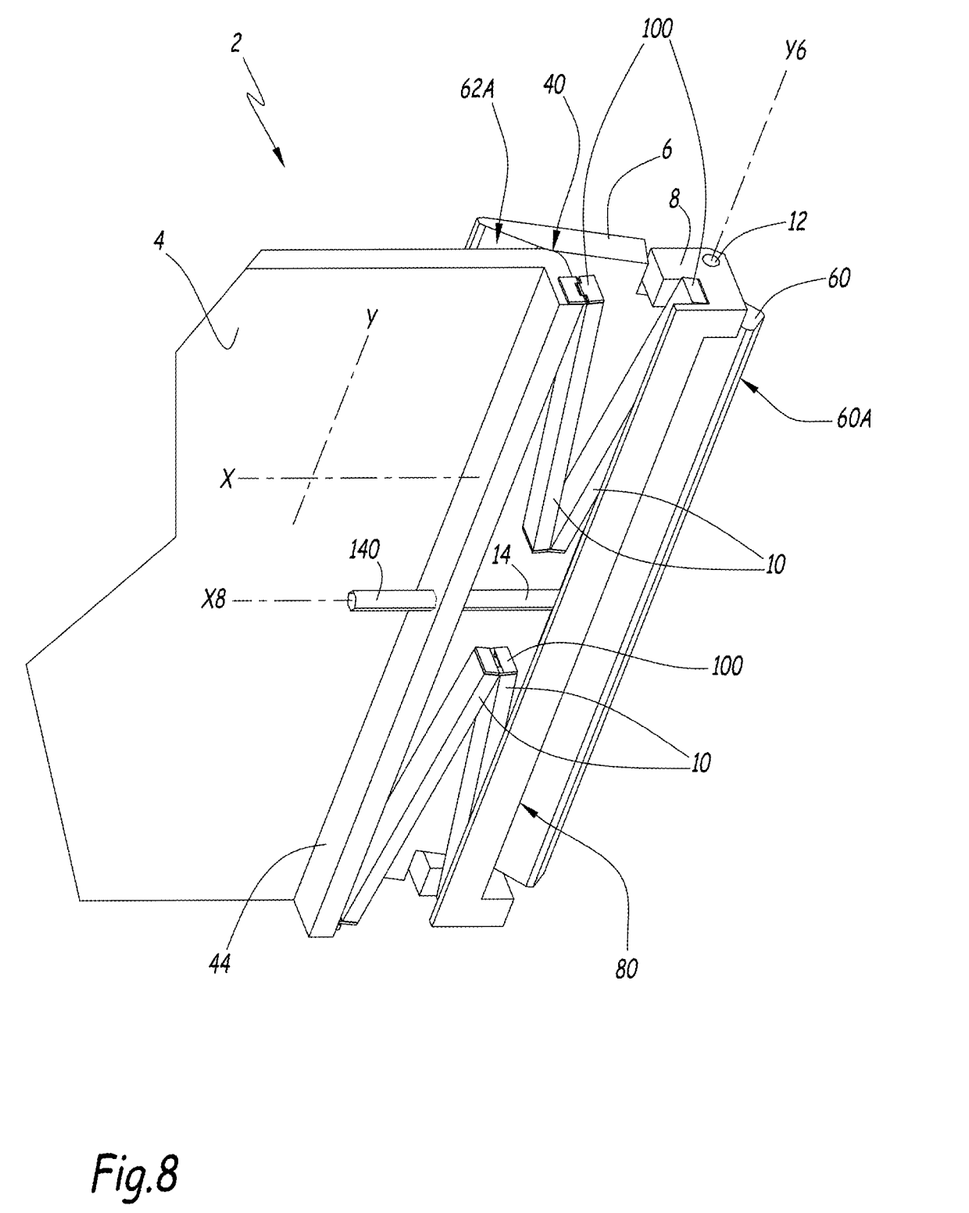
Figure 9:
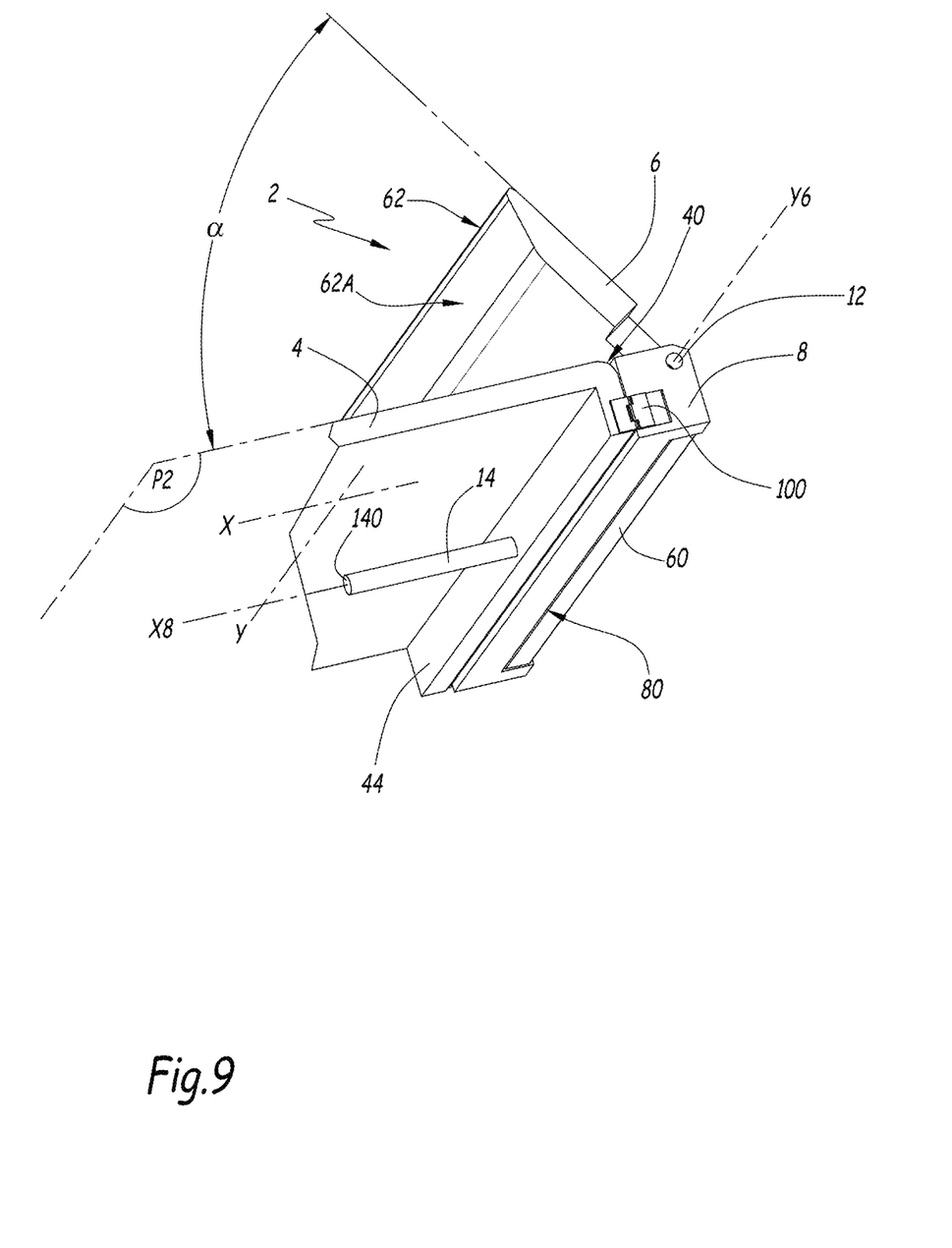

This double mobility makes it possible to obtain the following configurations:
- in a deployed configuration shown in FIGS. 2 and 6, the tray 6 is deployed jointly with the stationary part 4 in the plane P2, and the chassis 8 is in a position maximally separated from the stationary part 4;
- in a folded configuration shown in FIGS. 5 and 9, the tray 6 is pivoted along its axis of rotation Y6 in an inclined position relative to the stationary part 4, and the chassis 8 is in a position minimally separated from the stationary part 4.

This double mobility offers, aside from passenger comfort, for example to read or settle in, in particular for people with reduced mobility, better prevention of risks of abdominal injuries in case of collision causing the projection of the passenger onto the table top 2.

Indeed, the chassis 8 is able to go from the maximally separated position to the minimally separated position under the action of thrust from a body part of the passenger P. The tray 6 includes an inclined part 60 whereof one end 60A, forming a part of the table top 2 located closest to a passenger P seated on an adjacent chair F, is located below the axis of rotation Y6 of the tray 6. As a result, when the passenger P is projected on the tray 6 in case of collision (FIGS. 3 and 4), a force E is exerted on this end 60A with a lever arm relative to the axis of rotation Y6, which results in the rotation of the tray 6. The rotation of the tray 6 also results in increasing the area of the surface with which the body of the passenger P collides.

To absorb the energy of the passenger P projected against the table top 2, the translation of the chassis 8 is simultaneous with the rotation of the tray 6. An edge 62 of the tray 6 located across from the stationary part 4 includes a beveled lower part 62A. The stationary part 4 comprises an edge 40 suitable for cooperating with the beveled lower part 62A so as to initiate the rotation of the tray 6 around its axis Y6 during the translation of the chassis 8. For example, the edge 40 can be rounded or chamfered to cause sliding of the beveled part 62A.

Thus, during a collision, the operation of the table top 2 is as follows: initially (FIG. 2), the passenger P is seated against the chair F and is moved away from the tray 6. The tray 6 is deployed along the plane P2 in a fitted manner with the stationary part 4, and the chassis 8 is moved away from the stationary part 4.

Figure 3:
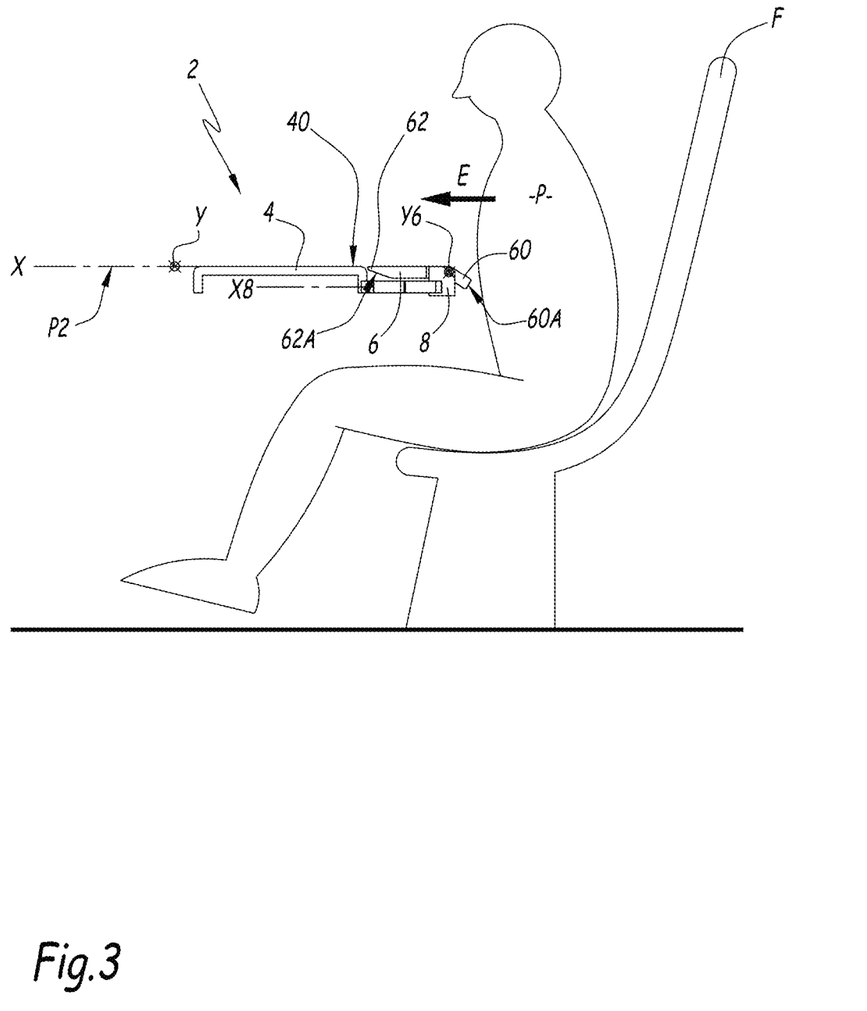
FIGS. 3 to 5 are side views similar to FIG. 2, illustrating three phases of a projection of the passenger against the table top.
Figure 4:
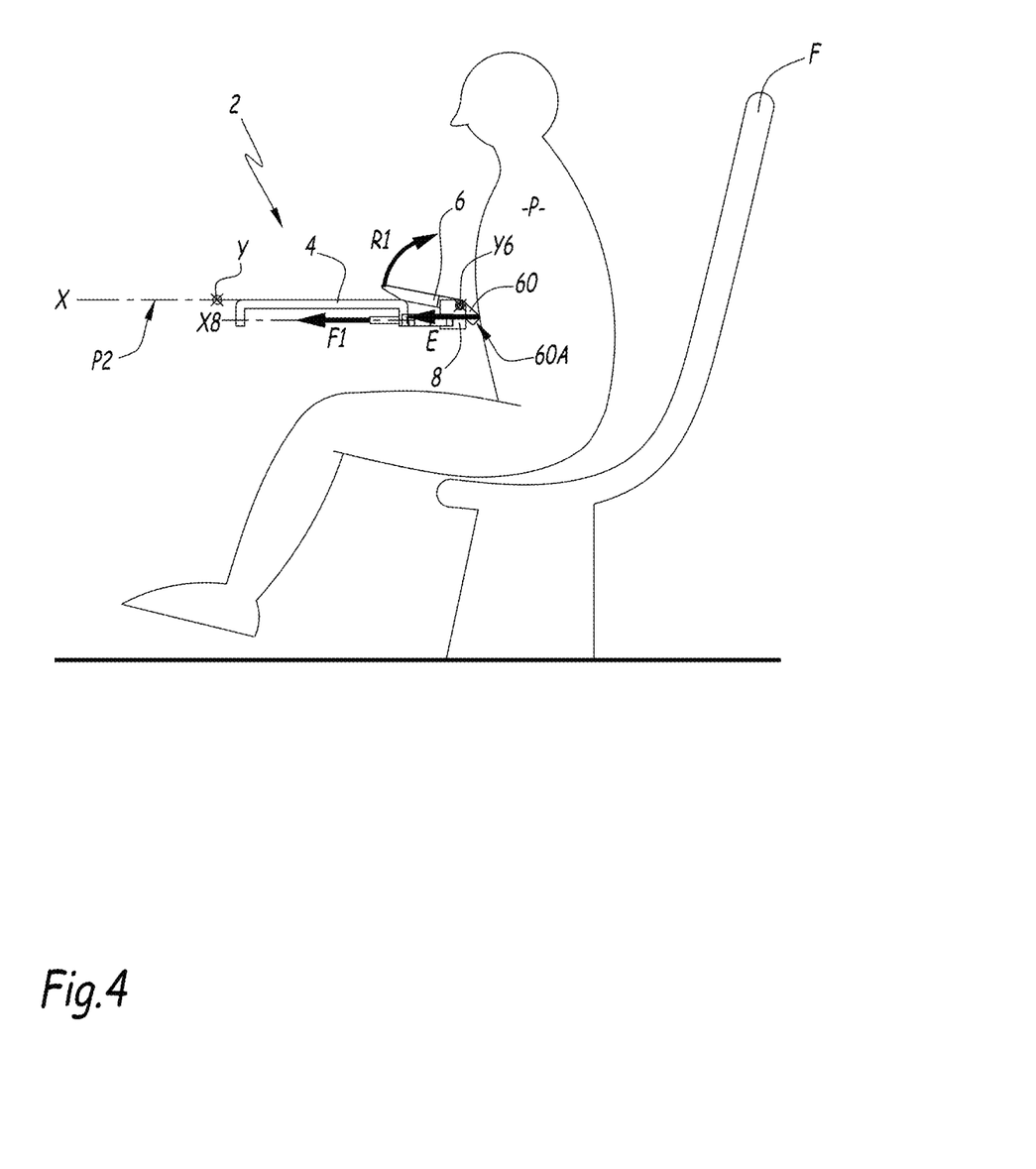

In FIG. 3, a collision takes place. The passenger P comes off his chair F and is projected against the tray 6. The passenger P then exerts the force E along the direction X. In FIG. 4, the passenger P has come into contact with the tray 6, which has begun a rotation along the arrow R1, simultaneously with a translation of the chassis 8 along the arrow F1.

In FIG. 5, the chassis 8 has completely approached the stationary part 4, and the tray 6 has arrived in an inclined position, in which it is oriented along an angle α of between 70° and 90° relative to the stationary part 4. In this position, the tray 6 offers a larger and less aggressive surface than the end 60A, which makes it possible to better distribute the energy of the passenger P onto the chest and abdomen and to reduce the risks of serious abdominal injuries.

The chassis 8 has a withdrawn part 80 suitable for housing the inclined part 60 of the tray 6 in the folded position (FIG. 9) as well as for limiting this position by a stop.

According to one advantageous embodiment, the tray 6 is mounted on the chassis 8 using friction hinges 12 and with axis Y6 able to keep the tray 6 in an inclined position, for example for a passenger who wishes to read.

The chassis 8 is connected to the stationary part 4 by arms 10 articulated on the stationary part 4 and on the chassis 8. For example, the chassis 8 can be connected by two pairs of arms 10. The arms 10 are connected to one another and to the stationary part 4 by hinges 100. The arms 10 make it possible to guide the translation of the chassis 8 and to support the tray 6 in the deployed configuration.

Optionally, the table top 2 comprises a shock absorber arranged between the chassis 8 and the stationary part 4. The shock absorber can be a shaft 14 fastened to the chassis 8 and sliding with friction in the stationary part 4. The shaft 14 comprises an end 140 that is initially concealed in a part 44 of the stationary part 4. During the translation of the chassis 8, the end 140 protrudes gradually until the shaft 140 is completely out of the part 44.

According to one variant that is not shown, the shock absorber can be a cylinder, one part of which is fastened to the chassis and another part of which is fastened to the stationary part of the table top, or any other suitable device.

FIG. 1 shows two trays 6 and two trays 7 of the conventional type in broken lines. In a variant, all four trays of the table top 2 can be of the type of the tray 6.

The table top 2 can be installed in the vehicle compartment other than a rail vehicle, for example in a road transport vehicle.

What is claimed is:

1. A table top for a vehicle compartment accommodating passengers, comprising:
   a stationary part connected to the vehicle,
   at least one moving tray configured to be located across from a passenger chair or seat, said tray being movable along an axis of rotation parallel to a plane of the table top, and
   a chassis on which the tray is mounted with the possibility of rotating along the axis parallel to the plane of the tray, said chassis being translatable relative to the stationary part of the tray along an axis parallel to the plane of the tray and perpendicular to the axis of rotation of the tray,
   wherein:
      in a deployed configuration, the tray is deployed jointly with the stationary part of the table top, the chassis being in a position maximally separated from the stationary part of the table top;
      in a folded configuration, the tray is pivoted along its axis of rotation in an inclined position relative to the stationary part of the table top, the chassis being in a position minimally separated from the stationary part of the table top, the mobile tray and stationary part have a flat table surface, and in the deployed configuration, the flat table surface of the stationary part and the flat table surface of the mobile tray are parallel and contiguous.

2. The table top according to claim 1, wherein the chassis is able to go from the maximally separated position to the minimally separated position under the action of thrust from a body part of a passenger.

3. The table top according to claim 2, wherein the tray includes an inclined part whereof one end, forming a part of the table top located closest to a passenger seated on an adjacent chair or seat, is located below the axis of rotation of the tray.

4. The table top according to claim 1, wherein in the inclined position, the tray is oriented along an angle of between 70° and 90° relative to the stationary part of the table top.

5. The table top according to claim 1, wherein the tray is mounted on the chassis using friction hinges able to keep the tray in an inclined position.

6. The table top according to claim 1, wherein the chassis is connected to the stationary part of the table top by arms articulated on the stationary part of the table top and on the chassis.

7. The table top according to claim 1, wherein the table top comprises a shock absorber arranged between the chassis and the stationary part of the table top.

8. The table top according to claim 7, wherein the shock absorber is a cylinder, one part of which is fastened to the chassis and another part of which is fastened to the stationary part of the table top.

9. The table top according to claim 7, wherein the shock absorber is a shaft fastened to the chassis and sliding with friction in the stationary part of the table top.

10. The table top according to claim 1, wherein the mobile tray is configured to rotate such that an edge of the mobile tray, facing the stationary part, is moved upwards above the axis of movement of the chassis and the axis of rotation of the tray, in the folded configuration.

11. A table top for a vehicle compartment accommodating passengers, comprising:

a stationary part connected to the vehicle, at least one moving tray configured to be located across from a passenger chair or seat, said tray being movable along an axis of rotation parallel to a plane of the table top, and a chassis on which the tray is mounted with the possibility of rotating along the axis parallel to the plane of the tray, said chassis being translatable relative to the stationary part of the tray along an axis parallel to the plane of the tray and perpendicular to the axis of rotation of the tray, wherein:

in a deployed configuration, the tray is deployed jointly with the stationary part of the table top, the chassis being in a position maximally separated from the stationary part of the table top, and in a folded configuration, the tray is pivoted along its axis of rotation in an inclined position relative to the stationary part of the table top, the chassis being in a position minimally separated from the stationary part of the table top wherein the chassis is able to go from the maximally separated position to the minimally separated position under the action of thrust from a body part of a passenger, and wherein an edge of the tray located across from the stationary part of the table top includes a beveled lower part, and the stationary part of the table top comprises an edge suitable for cooperating with the beveled lower part so as to initiate the rotation of the tray around its axis during the translation of the chassis.

* * * * *